United States Patent
Ren et al.

(10) Patent No.: US 10,533,777 B2
(45) Date of Patent: Jan. 14, 2020

(54) SELECTIVE SOLAR ABSORBERS WITH TUNED OXYGEN DEFICIENCY AND METHODS OF FABRICATION THEREOF

(71) Applicants: University of Houston System, Houston, TX (US); Massachusetts Institute of Technology, Cambridge, MA (US)

(72) Inventors: Zhifeng Ren, Pearland, TX (US); Feng Cao, Heilongjiang Sheng (CN); Daniel Kraemer, Cambridge, MA (US); Gang Chen, Cambridge, MA (US)

(73) Assignees: UNIVERSITY OF HOUSTON SYSTEM, Houston, TX (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 43 days.

(21) Appl. No.: 15/580,271

(22) PCT Filed: Jun. 17, 2016

(86) PCT No.: PCT/US2016/038112
§ 371 (c)(1),
(2) Date: Dec. 6, 2017

(87) PCT Pub. No.: WO2016/205672
PCT Pub. Date: Dec. 22, 2016

(65) Prior Publication Data
US 2018/0163995 A1 Jun. 14, 2018

Related U.S. Application Data

(60) Provisional application No. 62/182,325, filed on Jun. 19, 2015.

(51) Int. Cl.
*B32B 17/06* (2006.01)
*B32B 15/04* (2006.01)
(Continued)

(52) U.S. Cl.
CPC ............... *F24S 70/20* (2018.05); *F24S 70/30* (2018.05); *G02B 1/115* (2013.01); *G02B 19/0042* (2013.01); *Y02E 10/40* (2013.01)

(58) Field of Classification Search
USPC ......................... 428/426, 428, 432, 434, 688
See application file for complete search history.

(56) References Cited

U.S. PATENT DOCUMENTS 4,312,915 A   1/1982 Fan
4,582,764 A *  4/1986 Allerd .................... F24S 70/25
                                                    428/623

(Continued)

OTHER PUBLICATIONS

PCT/US2016/038112 International Search Report and Written Opinion dated Sep. 8, 2016 (14 p.).

*Primary Examiner* — Lauren R Colgan
(74) *Attorney, Agent, or Firm* — Conley Rose, P.C.

(57) ABSTRACT

Systems and methods disclosed herein are directed towards the fabrication of a solar absorber comprising an IR reflector layer deposited on a substrate; a first cermet layer deposited in contact with the IR reflector layer; a second cermet layer deposited in contact with the first cermet layer; a first anti-reflection coating layer deposited in contact with the second cermet layer; a second anti-reflection coating layer deposited in contact with the first anti-reflection coating layer. A sputtering process may be used to deposit some or all of the layers, and the YSZ layers in each cermet layer may be deposited with a tuned partial oxygen pressure in order to form a layer that is oxygen-deficient.

20 Claims, 10 Drawing Sheets

(51) Int. Cl.
*F24S 70/20* (2018.01)
*G02B 1/115* (2015.01)
*G02B 19/00* (2006.01)
*F24S 70/30* (2018.01)

(56) References Cited

U.S. PATENT DOCUMENTS

| | | | |
|---|---|---|---|
| 5,523,132 A | 6/1996 | Zhang et al. | |
| 8,555,871 B2 * | 10/2013 | Kuckelkorn | F24S 20/20 126/677 |
| 2004/0126594 A1 * | 7/2004 | Rubbia | F24S 70/30 428/446 |
| 2010/0313875 A1 * | 12/2010 | Kennedy | F24S 10/45 126/652 |
| 2014/0130794 A1 | 5/2014 | Antonaia et al. | |
| 2015/0015960 A1 | 1/2015 | Ren et al. | |
| 2015/0249165 A1 * | 9/2015 | Spano' | C23C 14/0688 359/360 |
| 2017/0336102 A1 * | 11/2017 | Ren | F24S 70/30 |

* cited by examiner

Annealing at 600 °C for 7 days

SELECTIVE SOLAR ABSORBERS WITH TUNED OXYGEN DEFICIENCY AND METHODS OF FABRICATION THEREOF

CROSS-REFERENCE TO RELATED APPLICATIONS

This application is a 35 U.S.C. § 371 national stage application of PCT/US2016/038112 filed Jun. 17, 2016, and entitled "Selective Solar Absorbers with Tuned Oxygen Deficiency and Methods of Fabrication Thereof," which claims priority to U.S. Provisional Application No. 62/182,325, entitled "Selective Solar Absorbers with Tuned Oxygen Deficiency and Methods of Fabrication Thereof," and filed Jun. 19, 2015, each of which is incorporated herein by reference in its entirety for all purposes.

STATEMENT REGARDING FEDERALLY SPONSORED RESEARCH OR DEVELOPMENT

The work disclosed in this application was funded by the Department of Energy under grant under award number DE-EE0005806, "Concentrated Solar Thermoelectric Power (CSP)", DOE SunShot CSP grant, and "Solid State Solar-Thermal Energy Conversion Center ($S^3TEC$)", an Energy Frontier Research Center funded by the U.S. Department of Energy, Office of Science, Office of Basic Energy Science under award number DE-SC0001299/DE-FG02-09ER46577.

BACKGROUND

Background of the Technology

Spectrally-selective solar absorbers are widely used in solar hot water systems and concentrating solar power (CSP) systems. The sunlight striking the earth is the most abundant renewable energy resource which makes solar thermal technologies one of the promising pathways to meet the rising energy demand while reducing the environmental impact of fossil fuels. Solar thermal technologies convert solar radiation into heat which can be used for domestic hot water systems and industrial processes, or for electricity generation via steam turbines and direct energy conversion technologies such as thermoelectric generators (STEGs) and thermophotovoltaics (STPVs).

BRIEF SUMMARY OF THE DISCLOSURE

In an embodiment, a solar absorber, comprising: an IR reflector layer in contact with a substrate; a first cermet layer in contact with the IR reflector layer; a second cermet layer in contact with the first cermet layer; a sputtered first anti-reflection coating layer in contact with the second cermet layer; and a sputtered second anti-reflection coating layer in contact with the first anti-reflection coating layer.

In an embodiment, a method of fabricating a solar absorber, comprising: depositing, by sputtering, an IR reflector layer on a substrate; depositing, by sputtering, a first cermet layer in contact with the IR reflector layer; depositing, by sputtering, a second cermet layer in contact with the first cermet layer; depositing, by sputtering, a first anti-reflection coating layer in contact with the second cermet layer; depositing, by sputtering, a second anti-reflection coating layer in contact with the first anti-reflection coating layer.

Exemplary embodiments described herein comprise a combination of features and characteristics intended to address various shortcomings associated with certain prior devices, compositions, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the exemplary embodiments disclosed herein, reference will now be made to the accompanying drawings in which.

DETAILED DESCRIPTION OF THE DISCLOSED EXEMPLARY EMBODIMENTS

Figure 1:
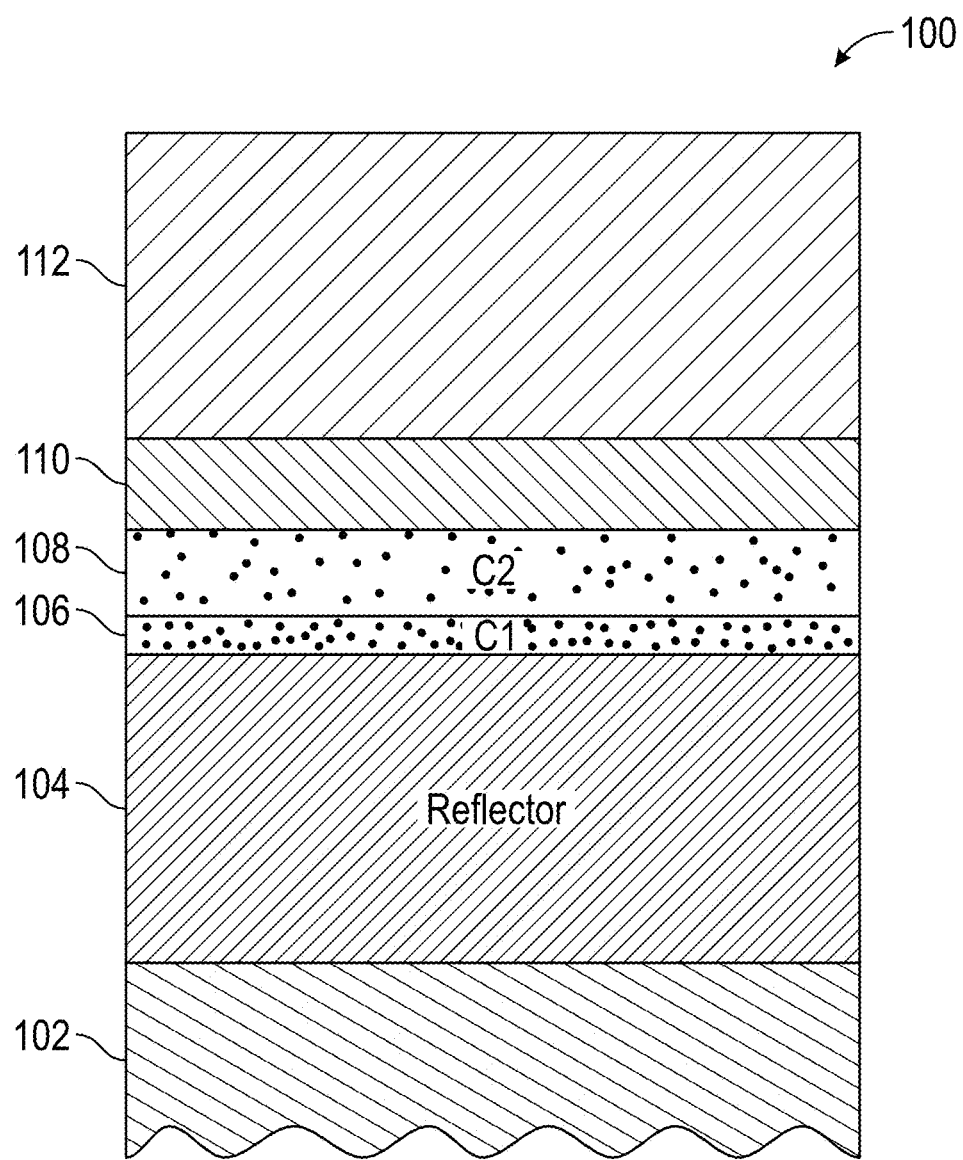
FIG. 1 is a schematic illustration of a cermet-based spectrally selective solar absorber according to certain embodiments of the present disclosure.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ."

The enhanced photo-thermal performance and the thermal stability at operational temperature is a crucial attribute for high-temperature applications of spectrally-selective solar absorbers. However, the performance of conventional solar absorbers at high temperatures (>about 450° C.) may be compromised by high infrared (IR) emittance and a lack of long term thermal stability.

Thermally stable high-temperature spectrally-selective solar absorbers can provide a working fluid with temperatures of 600° C. and above and enable a significant increase in the heat engine's conversion efficiency of solar power plants and the integration of solar and natural-gas power plants. A variety of spectrally-selective surfaces have been investigated as mid- and high-temperature solar absorbers such as surfaces based on semiconductor materials with intrinsic spectral selectivity due to a suitable bandgap energy from 0.5 to 1.26 eV and multilayer cermet structures comprising a ceramic host with metal filler particles. As shown herein, minimizing the IR emittance can be advantageous especially at moderate and low solar flux densities.

Cermet solar absorbers based on $W-Al_2O_3$, $Mo-SiO_2$, $Mo-Al_2O_3$ may be stable up to 500° C. In addition, $Mo-Si_3N_4$ based spectrally selective coatings showed a low total emittance of 0.109 at 600° C. which was estimated from bidirectional reflectance spectra measured at room temperature. However, the surfaces showed unsatisfactory thermal stability with a significant increase in emittance increases to 0.154 (600° C.) after surface annealing at 600° C. in vacuum. In some examples, the emittance of spectrally-selective surfaces calculated from the bidirectional reflectance spectra at room temperature is expected to be considerably underestimated compared to the true total hemispheric emittance.

A potential challenge for large-scale production of previously developed $Al_2O_3$-based cermet solar absorbers is the deposition rate of $Al_2O_3$. The deposition of $Al_2O_3$ may be a challenge due to relatively high surface binding energy of alumina molecules. In comparison, yttria-stabilized zirconia (YSZ) has a higher deposition rate and may be employed for use in solid oxide fuel cells, as high-temperature corrosion-resistive coatings, thermal barriers, and optical coatings due to the extraordinary thermal and chemical stability, high refractive index, as well as the transparency in the wavelength range from near IR (NIR) to ultraviolet (UV).

Systems and methods of fabrication of yttria-stabilized-zirconia (YSZ) and other ceramic host materials are discussed herein. In one embodiment, YSZ is employed as a ceramic host material for a spectrally-selective solar absorber based on a double cermet layer with W and Ni filler metals. The solar absorber is discussed herein in terms of its bidirectional spectral reflectance near room temperature and the directly measured solar absorptance and total hemispherical emittance at temperatures up to about 500° C. The solar absorber fabricated according to embodiments of the present disclosure is evaluated herein for thermal stability at about 600° C. in a vacuum.

YSZ cermet-based spectrally selective surfaces are employed as discussed herein for high-temperature solar absorber applications. In certain embodiments, the developed multilayer selective surface comprises two sunlight-absorbing W—Ni-YSZ cermet layers with different W—Ni volume fractions inside the YSZ matrix, two anti-reflection coatings (ARCs), and one tungsten IR reflection layer aimed at reducing IR emittance and improving thermal stability, deposited on a polished stainless steel substrate. In other embodiments, the substrate may comprise aluminum, copper, or other alloys and combinations of materials as appropriate for the end application or intermediate processing.

The two volume fractions of the first and the second cermet layers may be described herein as "high" and "low," and may refer to the total amount of Ni+W present as a volume fraction in the cermet layers. A high volume fraction may be up to about 80%, and a low volume fraction may be down to about 5%. The cermet layers may differ in the volume percentages by from about 10% to about 55%, and may be employed in varying thickness and volume fraction combinations depending upon the embodiment. The fabricated solar absorbers were tested for their long term thermal stability at 600° C., and a distinct change in surface morphology of the solar absorbers when oxygen is highly deficient in the YSZ-ARC layers. However, the oxygen deficiency can be effectively overcome through increasing the oxygen partial pressure during sputtering. This increased oxygen partial pressure may to a stable solar absorber with an experimentally demonstrated solar absorptance of about 0.91 and a total hemispherical emittance of about 0.13 at 500° C.

Experimental Details

A plurality of samples was prepared using magnetron sputtering equipment (AJA International, Inc.). The metals and dielectric materials are deposited by a DC and RF magnetron sputtering, respectively, and the cermet layers are deposited by co-sputtering the metals and the dielectric host. The deposition targets comprise high purity nickel (99.999%, 2" Dia.), tungsten (99.95%, 3" Dia.), YSZ (99.9%, 2" Dia., $ZrO_2/Y_2O_3$ 92/8 mol %), and $SiO_2$ (99.995%, 3" Dia.). In an embodiment, the deposition chamber was evacuated to lower than $4 \times 10^{-7}$ Torr before deposition. The deposition pressure is kept at 3 mTorr. In an embodiment, the IR reflector layer may comprise tungsten (W), silver (Ag), molybdenum (Mo), or combinations thereof. The W IR reflector layer, the cermet layers, and the $SiO_2$-ARC layer are deposited in an argon (Ar) plasma environment. The YSZ-ARC layers are deposited at different oxygen gas flow rates to determine the dependence of the oxygen partial pressure during deposition on the thermal stability of the fabricated surfaces.

In another embodiment, single YSZ layers were directly deposited on stainless steel and sapphire substrates at different oxygen partial pressures. The oxygen partial pressure is varied by adjusting the oxygen gas flow rate. At an oxygen gas flow rate of zero, the oxygen partial pressure is zero, an oxygen gas flow rate of 2 sccm (standard cubic centers per minute) results in an oxygen partial pressure of about 0.2 mTorr, and 4 sccm in about 0.375 mTorr. The detailed preparation parameters are summarized in table 1.

TABLE 1

Sputtering parameters of YSZ layers, cermet layers, and optimized spectrally-selective solar absorbers.

| Sample | Substrate | IR reflector layer | Cermet1 | Cermet2 | ARC1 | ARC2 |
|---|---|---|---|---|---|---|
| C1 | SS | NA | 120 nm | NA | NA | NA |
| C2 | SS | NA | NA | 120 nm | NA | NA |
| YSZ-1 | SS or Sapphire | NA | NA | NA | 80 nm (0 mTorr) | NA |
| YSZ-2 | SS or Sapphire | NA | NA | NA | 80 nm (0.2 mTorr) | NA |
| YSZ-3 | SS or Sapphire | NA | NA | NA | 80 nm (0.375 mTorr) | NA |
| WNY-1 | SS | 100 nm W | 12 nm | 30 nm | 29 nm (YSZ-1) | 93 nm |
| WNY-2 | SS | 100 nm W | 12 nm | 30 nm | 29 nm (YSZ-2) | 93 nm |
| WNY-3 | SS | 100 nm W | 12 nm | 30 nm | 29 nm (YSZ-3) | 93 nm |

Turning to FIG. 1, the stack 100 comprises two cermet layers C1 and C2 with different metal volume fractions, two ARC layers (YSZ and SiO$_2$), one tungsten IR reflector layer on a mechanically polished stainless steel substrate. In an embodiment, the multilayer stack "the stack" 100 may comprise a mechanically polished stainless steel substrate 102 that may be in contact with a first tungsten (W) IR reflector 104, which may be in contact with a first W—Ni-YSZ cermet layer 106. In alternate embodiments, the first cermet layer 106 may comprise YSZ and at least two of tungsten (W), nickel (Ni), tantalum (Ta), silver (Ag), and molybdenum (Mo).

The first cermet layer 106 may be in contact with a second W—Ni-YSZ cermet layer 108. In alternate embodiments, the second cermet layer 108 may comprise YSZ and at least two of tungsten (W), nickel (Ni), tantalum (Ta), silver (Ag), and molybdenum (Mo). The first cermet layer 106 may comprise a high metal volume fraction in comparison to the second cermet layer 108, which comprise a lower metal volume fraction in the YSZ ceramic host. The second cermet layer 108 may be in contact with a first anti-reflection coating (ARC) layer comprising YSZ 110 which is in contact with a second ARC layer 112 comprising SiO$_2$. In an embodiment such as the stack illustrated in FIG. 1, the tungsten IR reflector layer 104 was fabricated by sputtering at a DC power density of 2.2 W/cm$^2$, the Cermet1: W—Ni-YSZ 106 was fabricated by sputtering with a DC power density of 0.33 W/cm$^2$ for W and 0.99 W/cm$^2$ for Ni, and a RF power density of 7.4 W/cm$^2$ for YSZ, the Cermet2 108 layer W—Ni-YSZ was fabricated by sputtering at a DC power density of about 0.26 W/cm$^2$ for W, and 0.74 W/cm$^2$ for Ni, and a RF power density of 7.4 W/cm$^2$ for YSZ, the ARC1 110 was fabricated by sputtering YSZ at a RF power density of about 7.4 W/cm$^2$ with different oxygen partial pressures, and the ARC2 112 was fabricated by sputtering SiO$_2$ with a RF power density of 4.4 W/cm$^2$. The cermet layers (W—Ni-YSZ) 106 and 108 intrinsically absorb the solar radiation due to interband electronic transitions in the filler metals and plasmonic resonances present in the small metal particles. The ARC layers (YSZ 110 and SiO$_2$ 112) minimize surface reflection. The IR reflector layer 104 may comprise a 100 nm thick tungsten layer and may act as a diffusion barrier between the stainless steel substrate and the double cermet layer. In an embodiment, the layers 104, 106, 108, 110, and 112 as discussed herein may be disposed in varying thicknesses and at varying rates of deposition including the oxygen partial pressure used to dispose, e.g., sputter, the layers. The thickness of each layer, and the relative thickness of the layers, may be determined based upon the end application and/or what further processing may occur subsequent to the deposition. In one embodiment, the thickness of the first cermet layer 106 may be within +/−60% of the thickness of the second cermet layer 108.

The samples fabricated according to the embodiments of the present disclosure were characterized by performing X-ray diffraction (XRD) measurements with a PANalytical multipurpose diffractometer with an X'Celerator detector and Cu Kα radiation (λ=1.54056Å) operating at 45 kV and 40 mA. Raman scattering measurements were performed in the back-scattering geometry with a T64000 Raman spectrometer (Horiba Jobin Yvon) at room temperature with an air cooled Ar-ion laser (514 nm) as the excitation source. A Veeco Dimensions 3000 Atomic Force Microscope (AFM) is used to characterize the morphology and roughness of the surfaces. The thicknesses of the prepared coatings are measured with an Alpha-step 200 Profilometer (Tencor). The spectral bidirectional reflectance from 0.3 to 1.8 μm was measured with a Cary 500i spectrophotometer with an absolute spectral reflectance accessory at an angle of 8°. The spectral bidirectional reflectance in the wavelength range of 1.8 to 20 μm was recorded with a Nicolet 6700 FT-IR spectrometer with a gold mirror (Thorlabs) as reference/background sample at an incident angle of 12 degrees.

A steady-state calorimetric method was used to determine the solar absorptance and total hemispherical emittance at elevated temperatures of up to 500° C. in a vacuum chamber. A sample is attached to an electrical heater assembly and suspended in a vacuum chamber. The electrical input power required to maintain the sample at a steady-state set temperature is recorded. The electrical input power is related to the radiation heat loss from the sample surface and used to obtain the total hemispherical emittance at elevated temperatures. The parasitic heat losses from the heater via radiation and lead wire heat conduction are largely minimized by performing a parasitic heat loss calibration measurement. Regarding the solar absorptance, the sample is also attached to an electrical heater assembly and suspended in a vacuum chamber facing a viewport. The sample surface is illuminated with various radiation fluxes from a solar simulator and the electrical input power to the heater assembly is accordingly adjusted to maintain the steady-state set temperature. The solar absorptance is obtained from the change in electrical power input for a change in the illumination flux. The transmittance spectra of the single YSZ layer coated on sapphire are also measured on a Cary 500i spectrophotometer. The thermal stability test is carried out in a tubular furnace at 600° C. for 7 days under a pressure of ~5×10⁻³ Torr.

Figure 2:
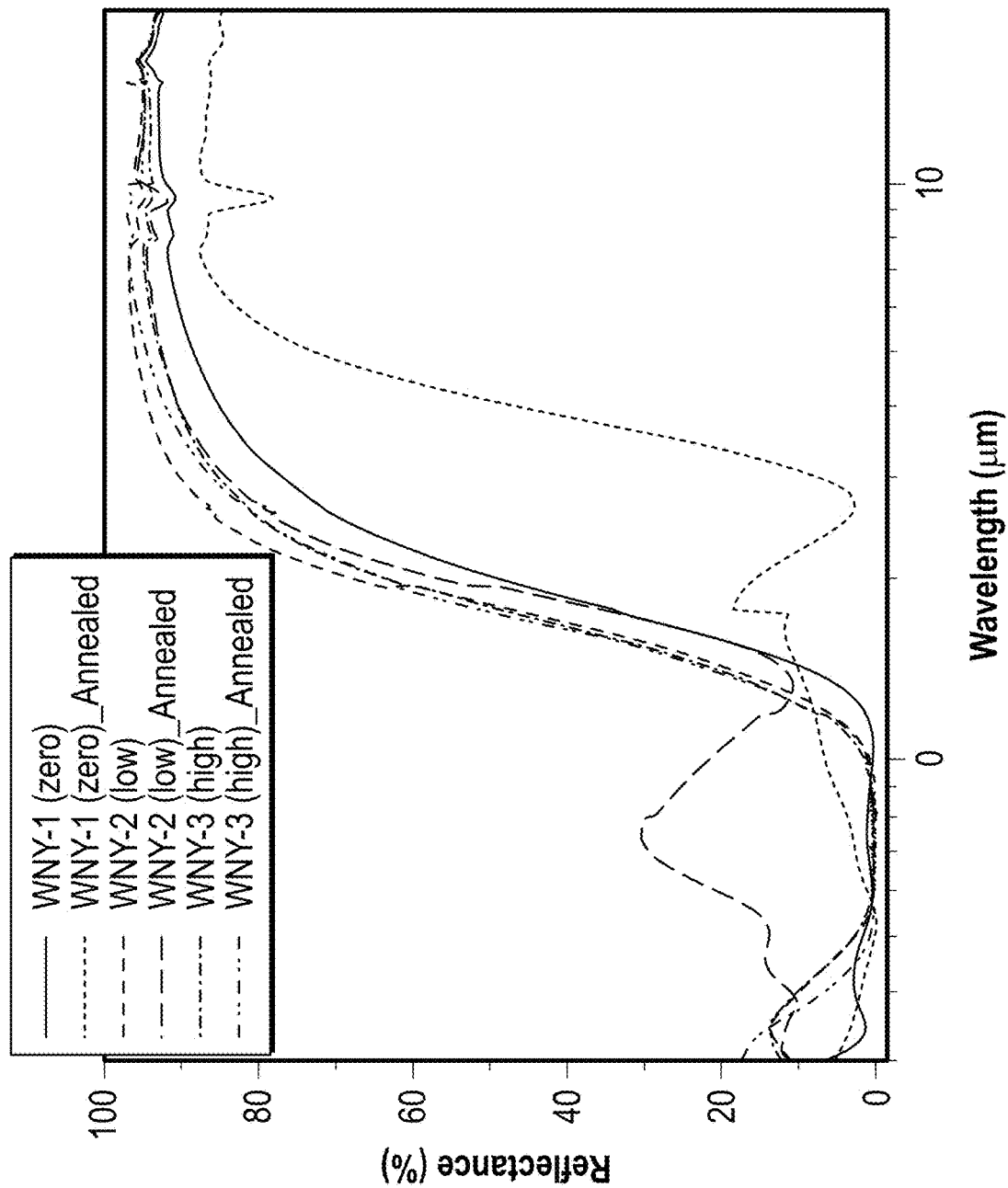
FIG. 2 is a graph of the bidirectional reflectance spectra of solar absorbers deposited with different oxygen partial pressures according to certain embodiments of the present disclosure.

An oxygen deficient YSZ layer will be achieved if the oxygen partial pressure is low enough during the sputtering process due to the deficiency resulting from the recombination of atomic oxygen to molecular oxygen in argon (Ar) plasma. Thus, the YSZ ARC layers were deposited as discussed herein at different oxygen partial pressures (Table 1) to study the effect of the partial pressure deposition on the solar selectivity and thermal stability of the solar absorber. The resulting bidirectional reflectance spectra of the solar absorbers are shown in FIG. 2. The spectral reflectance below 1.1 µm is relatively small in all the as-deposited samples, which may be due to the particular configuration of double cermet layers and double ARC layers. The sharp transition from low to high spectral reflectance occurs in the wavelength range of ~1 µm to 3 µm, which indicates a low spectral emittance above 3 □m induced by the tungsten IR reflector layer. With reduced oxygen deficiency (films deposited at higher oxygen partial pressures), the spectral reflectance increases in both the UV and IR wavelength regions and transition shifts to shorter wavelength, possibly due to a decreasing optical thickness of the YSC ARC.

Upon annealing in vacuum for 7 days at 600° C., significant changes in the reflectance spectra are observed for the absorbers with the YSC-ARC layers deposited at zero (WNY-1) and low oxygen partial pressures (WNY-2). In order to evaluate the solar absorptance and total-directional emittance from bi-directional reflectance spectra, it is assumed that there is less difference on specular reflectance between incident angles of 8° and 12°. Since the specular reflection is dominated compared to the diffuse refection on those absorbers, according to the Kirchoff's law, the spectral absorptance of the opaque materials can be expressed in terms of total reflectance, and spectral absorptance is equal to spectral emittance. The solar absorptance and total-directional emittance can be calculated using bidirectional reflectance spectra (Table 2). An increase of the emittance on WNY-1 causes by the degradation of IR reflector. A decrease of the absorptance on WNY-2 indicates the degradation of cermet absorption layers. The solar absorptance and thermal emittance are most stable with highest oxygen partial pressure during the YSZ-ARC layer deposition (WNY-3), indicating that the developed spectrally-selective solar absorbers are promising for high temperature solar thermal applications.

Turning to FIG. 2, the bidirectional reflectance spectra of solar absorbers deposited with different oxygen partial pressures is shown both before and after annealing. The annealing process comprises annealing the samples at about 600° C. for about 7 days. Sample WNY-1 (black solid and dashed lines) was deposited at 0 mTorr oxygen partial pressure, sample WNY-2 (red solid and dashed lines) was deposited at a relatively low (0.2 mTorr) oxygen partial pressure as compared to the sample WNY-3 (blue solid and dashed lines)) which was deposited at about 0.375 mTorr oxygen partial pressure. The bidirectional reflectance spectra is shown for the YSZ ARC layers before (solid lines) and after (dash lines) the annealing.

Table 2 illustrates the estimated solar absorptance (solar spectrum [AM 1.5 direct+circumsolar] and the weighted integration of bidirectional reflectance spectra) and total-directional emittance (the integration of bidirectional reflectance spectra weighted by blackbody spectrum at 82° C. and 500° C.) of solar absorbers fabricated according to embodiments of the present disclosure both before and after annealing at 600° C. for 7 days in vacuum.

TABLE 2

| | Before annealing | | | After annealing | | |
|---|---|---|---|---|---|---|
| | | Emittance | | Absorp- | Emittance | |
| Sample | Absorptance | 82° C. | 500° C. | tance | 82° C. | 500° C. |
| WNY-1 | 95.5% | 8.2% | 15.0% | 95.7% | 16.0% | 40.9% |
| WNY-2 | 93.0% | 4.4% | 7.1% | 77.7% | 5.8% | 10.8% |
| WNY-3 | 92.7% | 5.9% | 10.1% | 93.0% | 4.5% | 8.5% |

The spectral bidirectional reflectance measurement is a useful and quick tool employed to screen the developed solar absorbers. However, to determine to what extent the solar absorptance is dependent on the operating temperature of the solar absorber and to obtain a more realistic value for the total-hemispherical emittance a previously developed steady-state calorimetric method was employed.

Figure 3A:
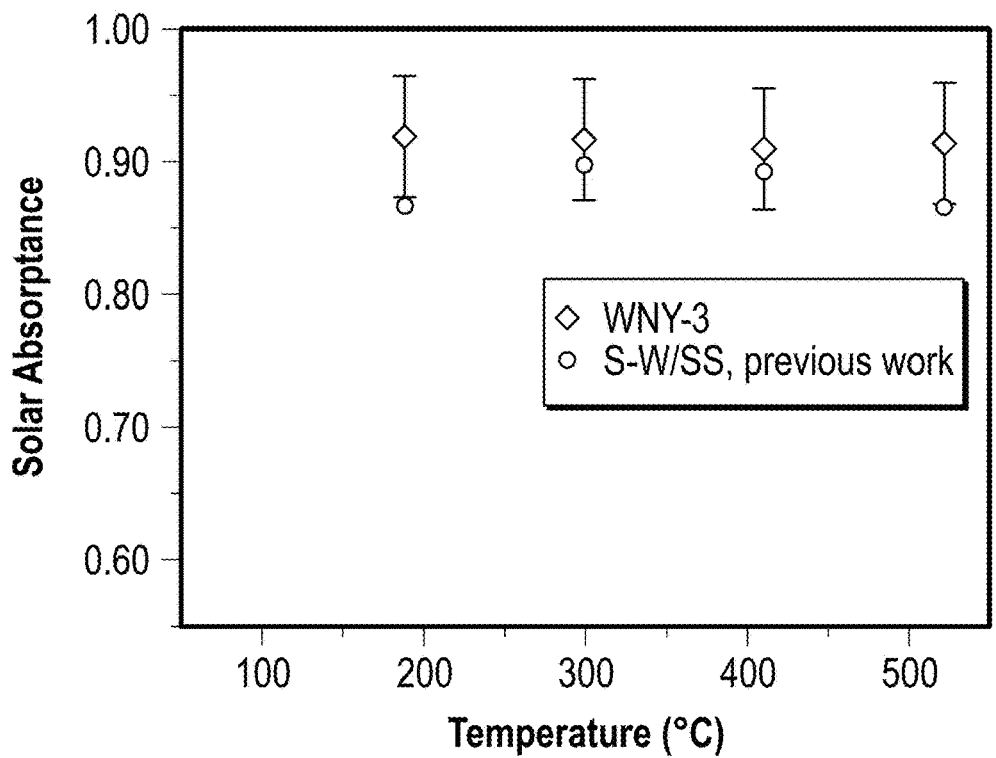
FIGS. 3A and 3B illustrate near normal solar absorptance and total hemispherical emittance of a solar absorber fabricated according to certain embodiments of the present disclosure.
Figure 3B:
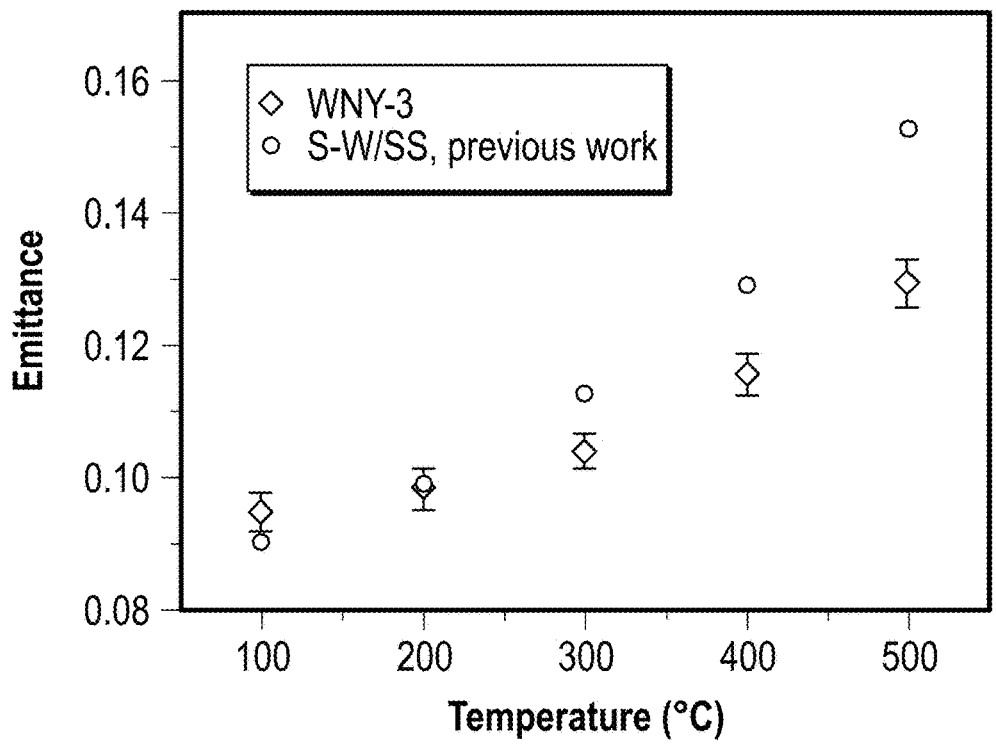

In an embodiment for a first solar absorber sample (WNY-3), a temperature-independent solar absorptance of ~0.91 was observed up to 500° C. (FIG. 3A) which is close to the calculated solar absorptance from spectral bidirectional reflectance data shown in Table 2 below. The total hemispherical emittance with 0.13 at 500° C. (FIG. 3B) is almost 30% higher than that expected from the bidirectional spectrum data at room temperature and blackbody spectrum at 500° C. which can be explained with the inaccuracies in obtaining the emittance from a spectral reflectance measurement of a highly reflective sample. The total hemispherical emittance (FIG. 3B) expectedly increases with temperature due to the shift of the blackbody spectrum to shorter wavelength with increasing temperature and the temperature dependence of the optical properties. In spite of the discrepancies, a very competitive IR emittance of 0.13 is demonstrated at 500° C. (FIG. 3B).

Figure 4A:
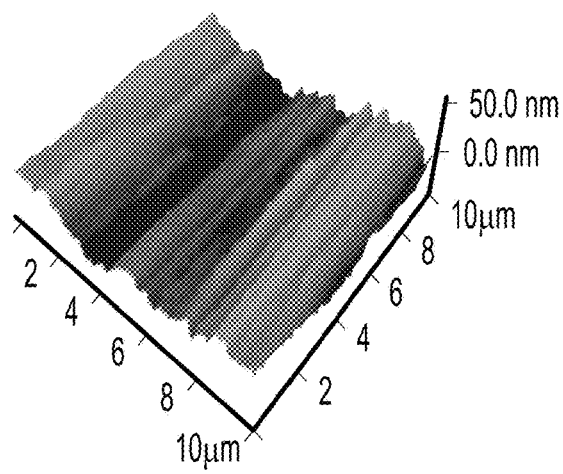
FIGS. 4A-4F comprise atomic force microscopy (AFM) images of solar absorbers with various oxygen partial pressure fabricated according to certain embodiments of the present disclosure in pre- and post-anneal conditions.
Figure 4B:
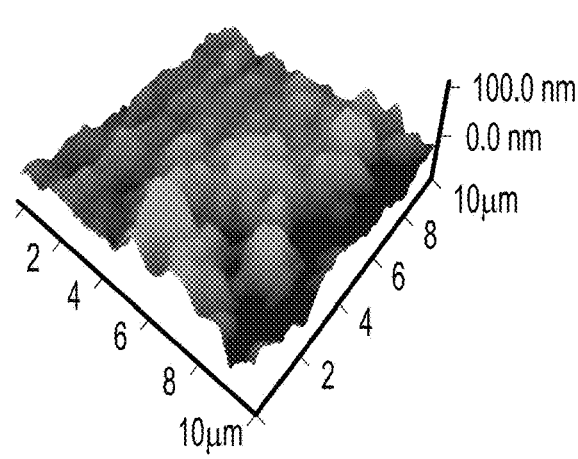
Figure 4C:
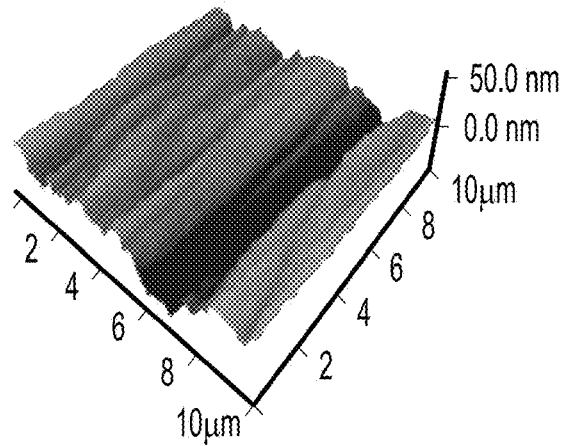
Figure 4D:
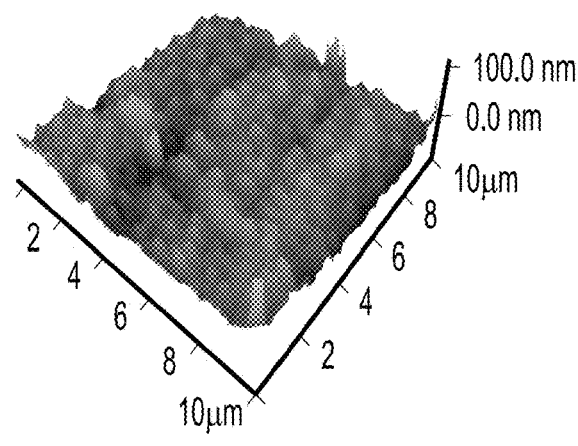
Figure 4E:
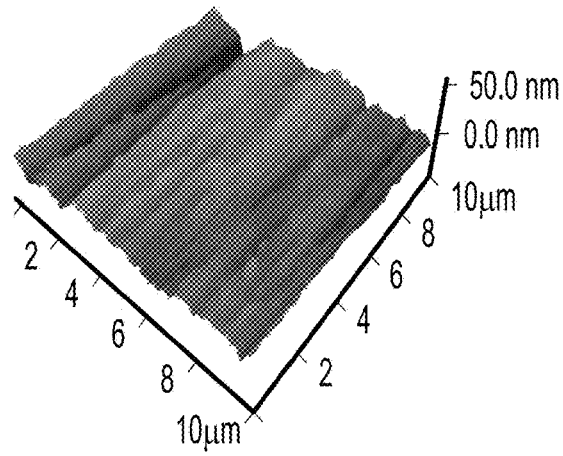
Figure 4F:
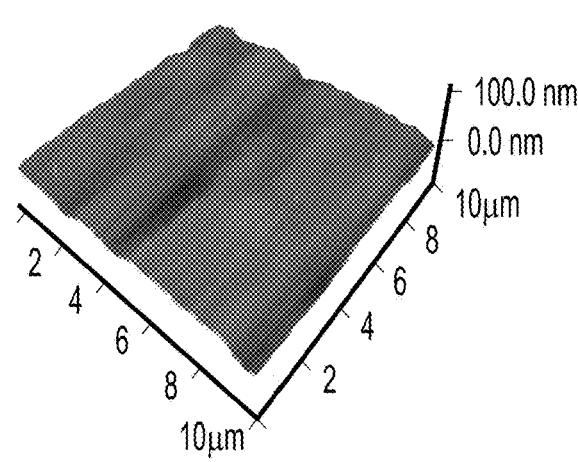

In order to understand the observed changes in the optical properties of the fabricated solar absorbers shown in FIG. 2, possible degradation mechanisms were evaluated that may occur during the high temperature annealing process. Changes in the surface morphology can be responsible for changing radiative properties at high temperatures. Changes in surface morphologies in terms of surface roughness and average particle size were observed upon high-temperature annealing for the solar absorbers with the YSZ layers deposited at both zero before annealing (FIG. 4A) and after annealing (FIG. 4B) and YSZ layers deposited ab about 0.2 mTorr oxygen partial pressures before annealing (FIG. 4C) and after annealing (FIG. 4D), and YSZ layers deposited at about 0.375 mTorr oxygen partial pressure before annealing (FIG. 4E) and after annealing (FIG. 4F). The annealing as discussed with respect to FIGS. 4B, 4D, and 4F, was performed at about 600° C. for 7 days.

The root mean square roughness ($R_q$) increases from about 8-11 nm to about 15-18 nm, and the average particle size increases from about 70 nm to about 300-500 nm. The initial groove structure created by the mechanical polishing process of the stainless steel substrate disappears upon annealing due to the diffusion and growth of particles (FIGS. 4A-4D). The solar absorber prepared with the YSZ ARC layer deposited at high oxygen partial pressure (0.375 mTorr) exhibited changes in the surface morphology are suppressed (FIGS. 4E-4F). The cause for the changes in the surface morphology can possibly be linked to the oxygen deficiency in the deposited cermet and YSZ ARC layer which leads to a larger number of density of vacancies and stresses within the layers. Both vacancies and stresses promote diffusion processes within the layers at high temperature leading to the observed accelerated deformation of the surfaces. However, depositing the YSZ ARC layer at a high enough oxygen partial pressure yields a fully oxidized YSZ layer which is proven to be a thermally stable high temperature ceramic and thus, suppresses the surface deformation and the change in the optical properties.

Figure 5A:
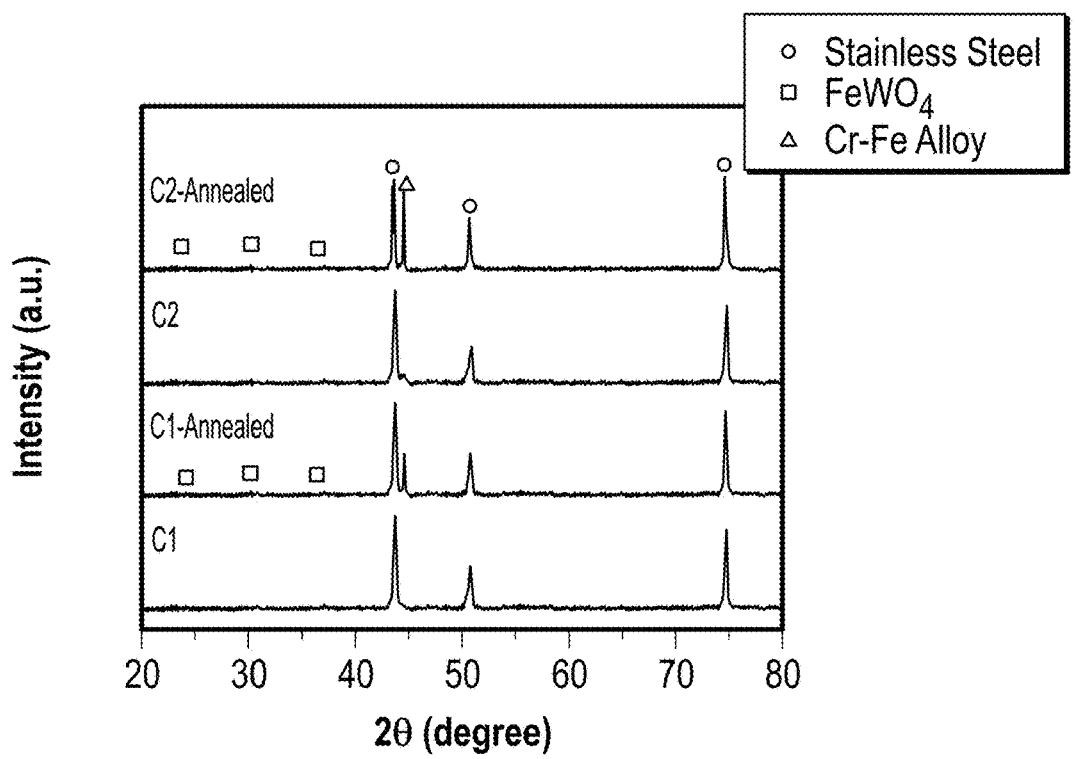
FIGS. 5A and 5B comprise x-ray diffraction (XRD) patterns and Raman spectra of cermet coatings fabricated according to certain embodiments of the present disclosure with high metal volume fraction and low metal volume fraction in YSZ matrix before and after annealing.
Figure 5B:
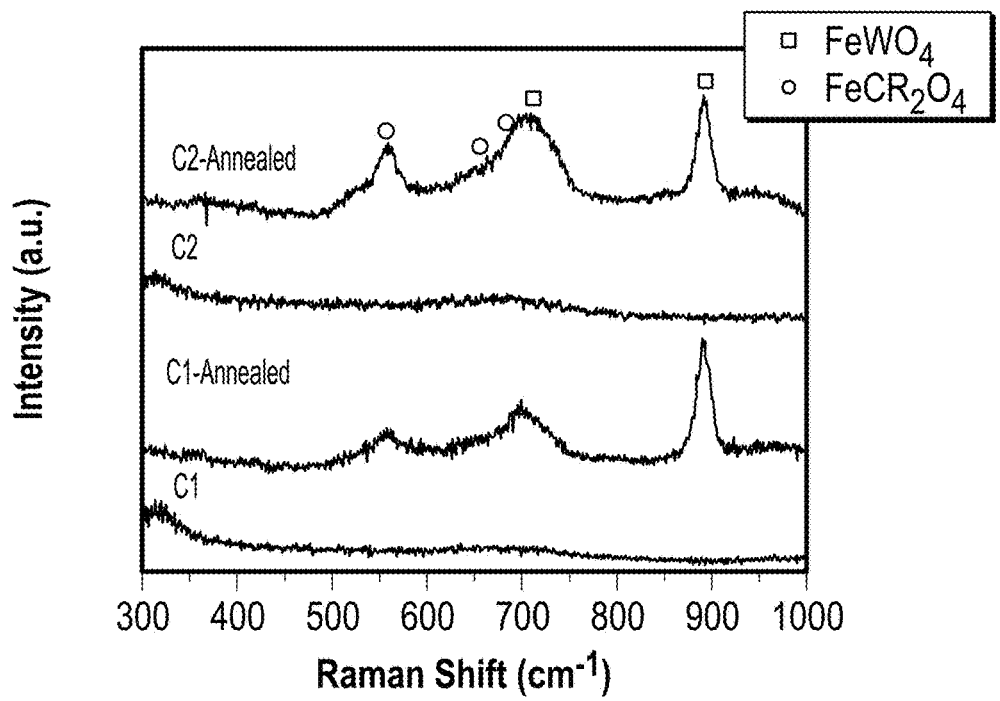
Figure 6A:
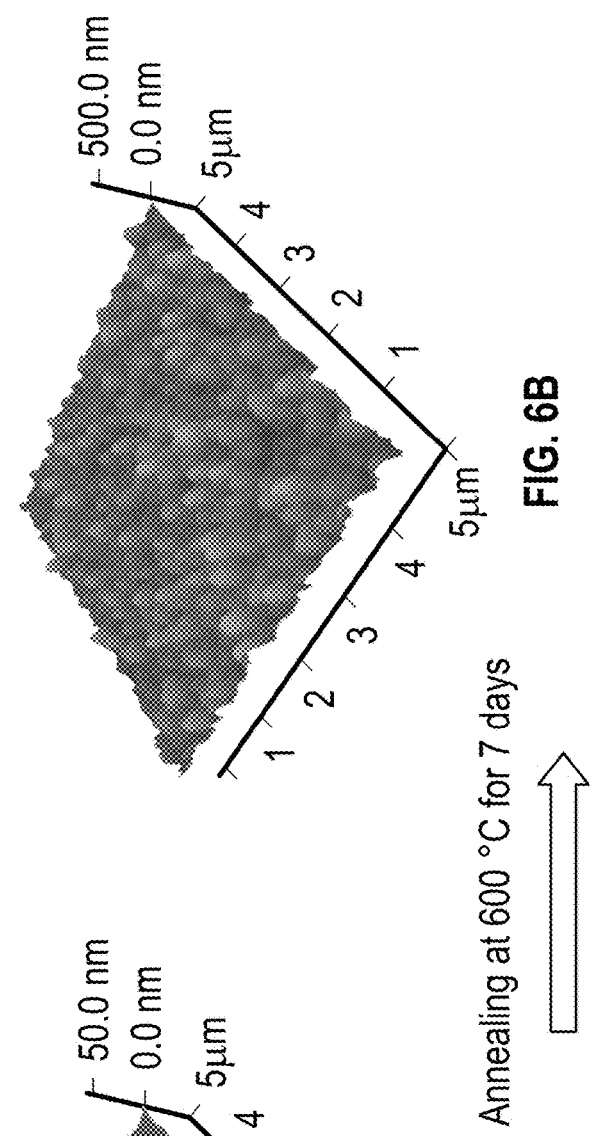
FIGS. 6A-6D comprise atomic force microscopy (AFM) images of cermets deposited on stainless steel substrates with high metal volume fraction and low metal volume fraction in YSZ matrix before and after annealing.
Figure 6B:
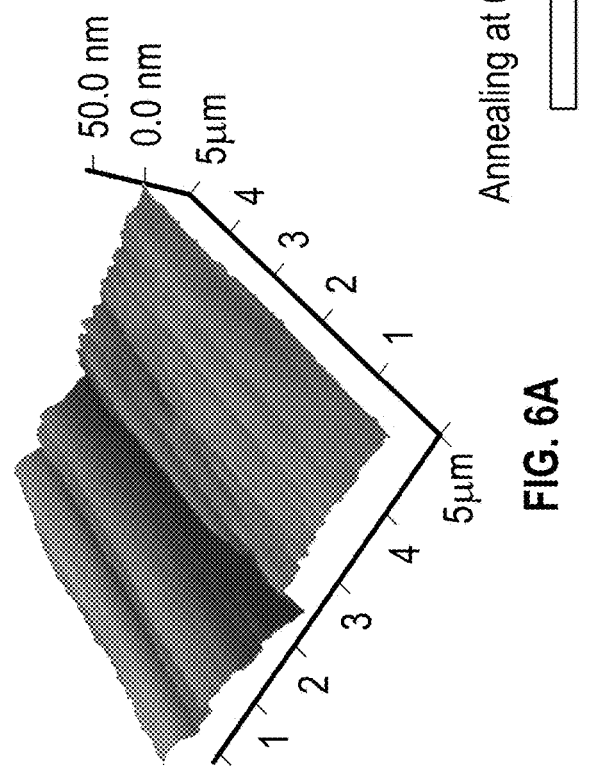
Figure 6C:
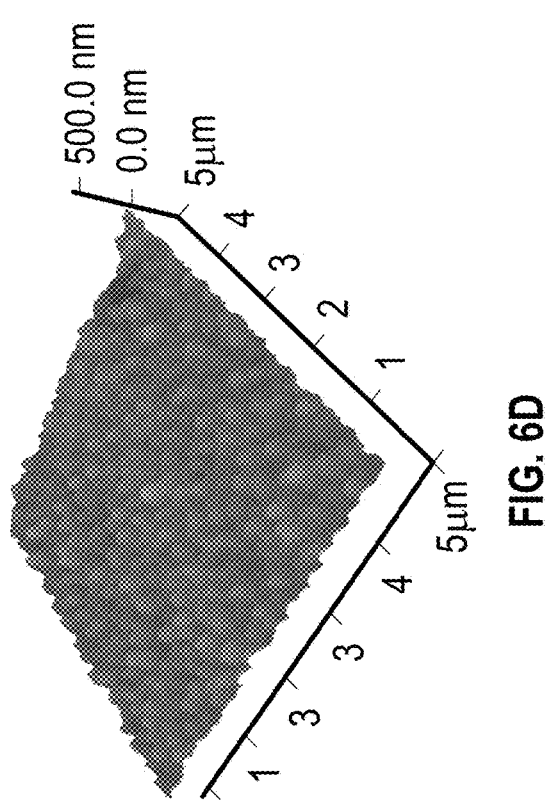
Figure 6D:
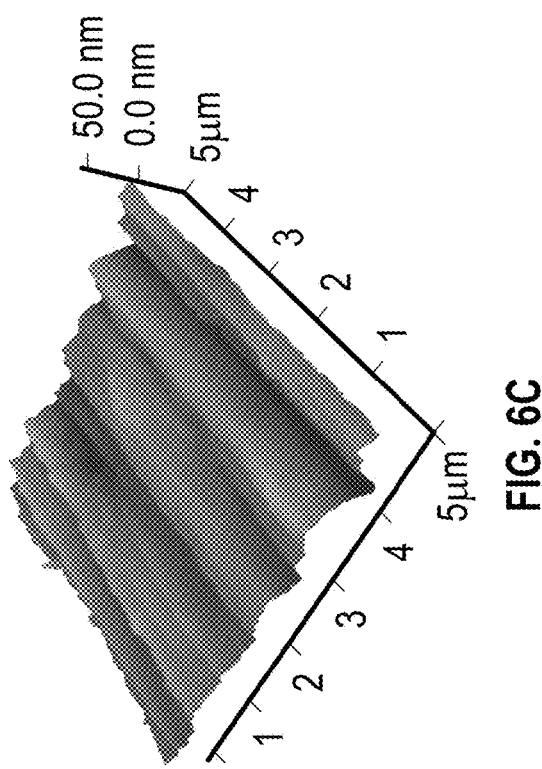

Referring now to FIGS. 5A and 5B, FIG. 5A is an x-ray diffraction graph of a cermet coating with a high metal volume fraction (C1) in the YSZ matrix and a cermet coating with a low metal volume fraction (C2) in the YSZ matrix that may be similar to layers 106 and 108 in FIG. 1. The pre- and post-anneal (at about 600° C. for about 7 days) conditions are shown in FIG. 5A. FIG. 5B is a Raman spectra of a cermet coating with a high metal volume fraction (C1) in the YSZ matrix and a cermet coating with a low metal volume fraction (C2) in the YSZ matrix that may be similar to layers 106 and 108 in FIG. 1. The pre- and post anneal (at about 600° C. for about 7 days) conditions are shown in FIG. 5A. In other embodiments, the annealing temperature(s) and time may vary, depending upon various characteristics of the disposed layer(s) including the oxygen partial pressure of deposition, metal volume fraction, layer thickness, and relative layer thickness.

FIG. 6. AFM images of cermet layers deposited on stainless steel substrates with high metal volume fraction in YSZ matrix before (a) and after (b) annealing and low metal volume fraction in YSZ matrix before (c) and after (d) annealing at 600° C. for 7 days. The same cermet layer in above-mentioned solar absorbers can be excluded for the cause of the degradation of solar absorbers, and the properties of the new cermet material (W—Ni-YSZ) were evaluated through analyzing the morphology and phase change upon annealing of a cermet layer on stainless steel substrate. Before annealing the single cermet layers with different metal volume fraction in YSZ on stainless steel (C1 and C2) show the sharp diffraction peaks from the stainless steel substrate (FIG. 5A). However, after annealing, the XRD patterns in FIG. 5A display the Cr—Fe alloy peaks which may be due to the insufficient oxidation of Cr metal at the oxide-metal interface, and additional small peaks of FeWO$_4$ phase resulting from the reaction of diffused Fe from stainless steel and tungsten in residual oxygen environment. The presence of the FeWO$_4$ phase is also seen in the Raman spectra (FIG. 5b), which have two distinct Raman peaks at 882 cm$^{-1}$ and 691 cm$^{-1}$ for the annealed cermet samples (C1 and C2) caused by the A$_g$ modes of the FeWO$_4$ phase. Therefore, the diffusion of Fe atoms cannot be suppressed by switching from Al$_2$O$_3$ to YSZ as the host material. In addition to the FeWO$_4$ phase a FeCr$_2$O$_4$ phase was additionally observed in the annealed cermet samples resulting from the oxidation of stainless steel substrate during long term annealing at 600° C. The roughness (R$_q$) increases from 7-9 nm to 34-37 nm and particle size increases from ~50 nm to 300-400 nm (FIG. 6). The same procedures are carried out on the 80 nm thick YSZ layer deposited with different oxygen partial pressures to investigate the fundamental properties of YSZ-ARC layer since the only difference among solar absorbers (WNY-1, WNY-2, and WNY-3) is on it.

All the single YSZ-ARC layers (YSZ-1, YSZ-2, and YSZ-3) deposited on SS with different oxygen partial pressures show two weak peaks marked with filled star in XRD patterns before annealing, which can be indexed to the YSZ phase (FIG. 7).$^{31}$ The films deposited at ambient temperature are partially crystallized. This is different to other dielectric films, such as SiO$_2$, Al$_2$O$_3$, prepared with the same procedures exhibiting amorphous nature. Other peaks marked with filled circles and filled triangles can be attributed to the stainless steel substrate. The YSZ further crystallizes during a high temperature annealing process as indicated by the more pronounced YSZ peaks in the annealed samples. The three single YSZ layers (YSZ-1. YSZ-2, YSZ-3) experience a similar morphology change upon annealing with both particle size and roughness increasing, as discussed below with respect to FIGS. 8A-8F. Compared with the solar absorber (WNY-1, WNY-2, and WNY-3) and cermet samples (C1 and C2), the roughness changes only very little from 6-7 nm to 8-10 nm.

Figure 7:
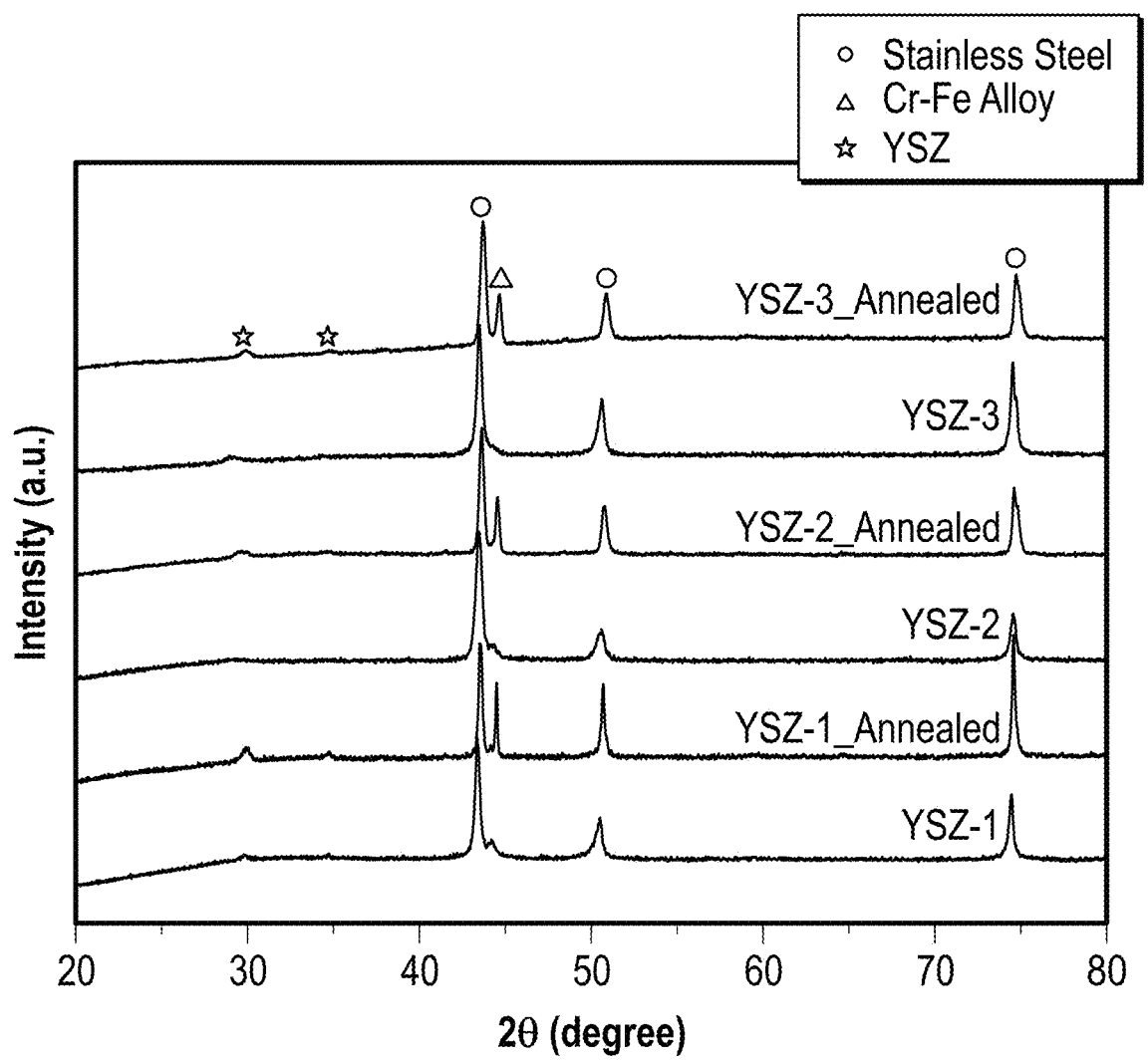
FIG. 7 is a graph of XRD patterns of single YSZ layers deposited on stainless steel substrates using different oxygen partial pressure, both before and after annealing.
Figure 8A:
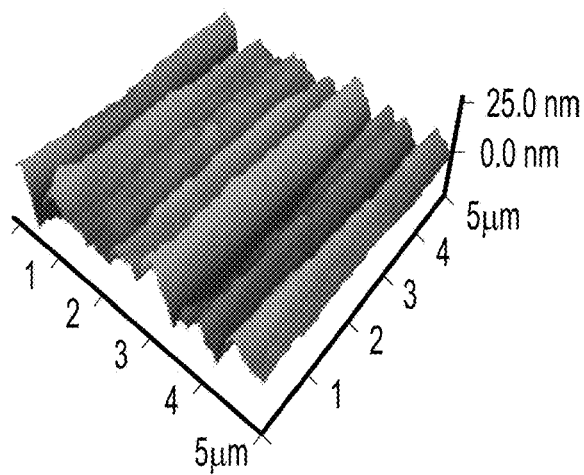
FIGS. 8A-8F are AFM images of single YSZ coating deposited on stainless steel substrates using varying partial pressures both before and after annealing.
Figure 8B:
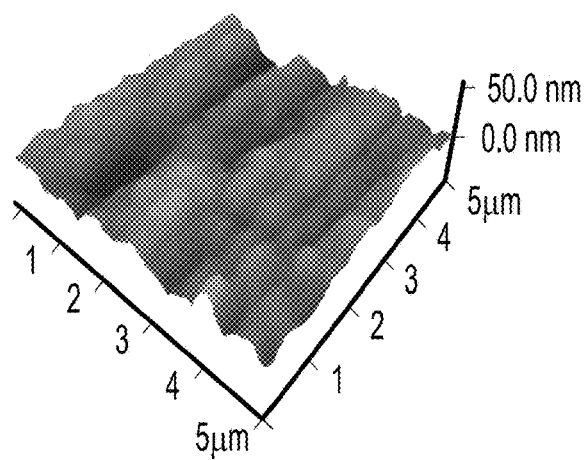
Figure 8C:
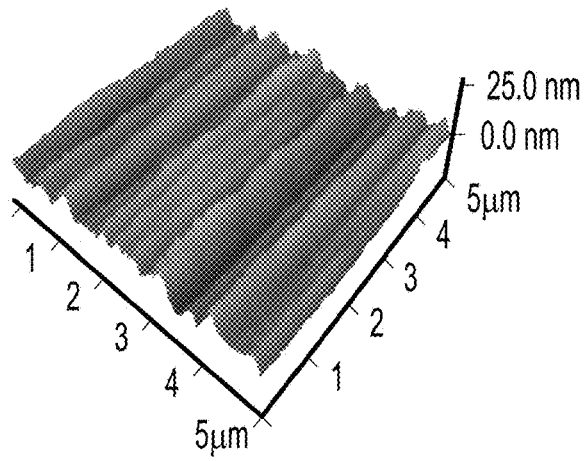
Figure 8D:
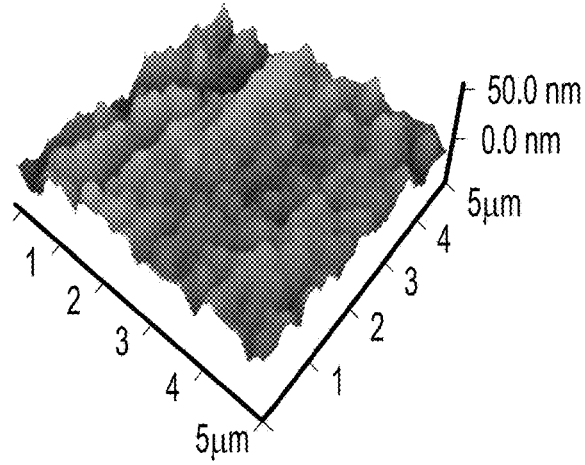
Figure 8E:
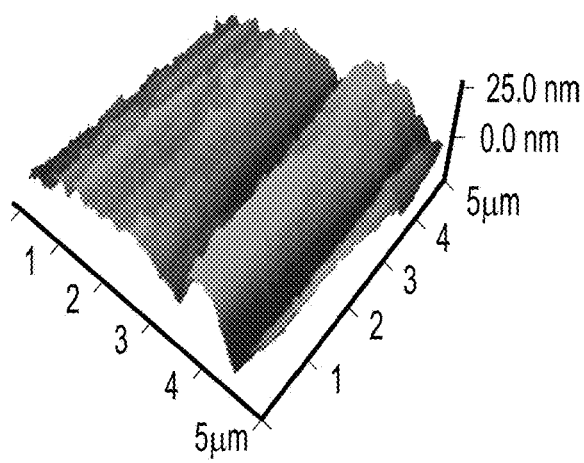
Figure 8F:
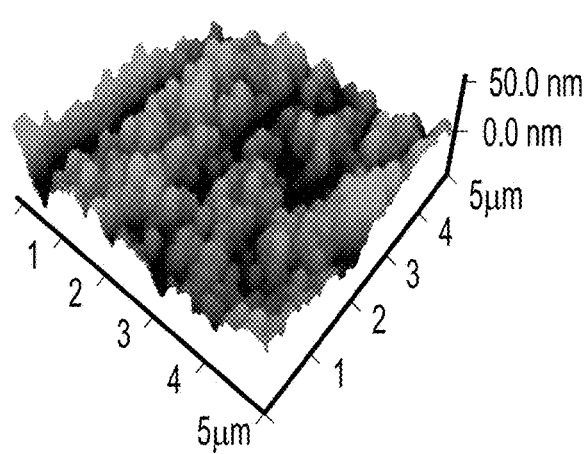

Referring to FIG. 7, which illustrates XRD patterns of single YSZ layers deposited on stainless steel substrates using different oxygen partial pressure, both before and after annealing at about 600° C. for 7 days. In an embodiment, YSZ-1 was deposited using 0 mTorr oxygen partial pressure; YSZ-2 was deposited using 0.2 mTorr oxygen partial pressure; YSZ-3 was deposited at about 0.375 mTorr oxygen partial pressure.

Turning to FIGS. 8A-8F, AFM images of single YSZ coating deposited on stainless steel substrates, with zero oxygen partial pressure before (FIG. 8A) and after (FIG. 8B) annealing, 0.2 mTorr oxygen partial pressure before (FIG. 8C) and after (FIG. 8D) annealing, and 0.375 mTorr oxygen partial pressure before (FIG. 8E) and after (FIG. 8F) annealing at 600° C. for 7 days.

Figure 9:
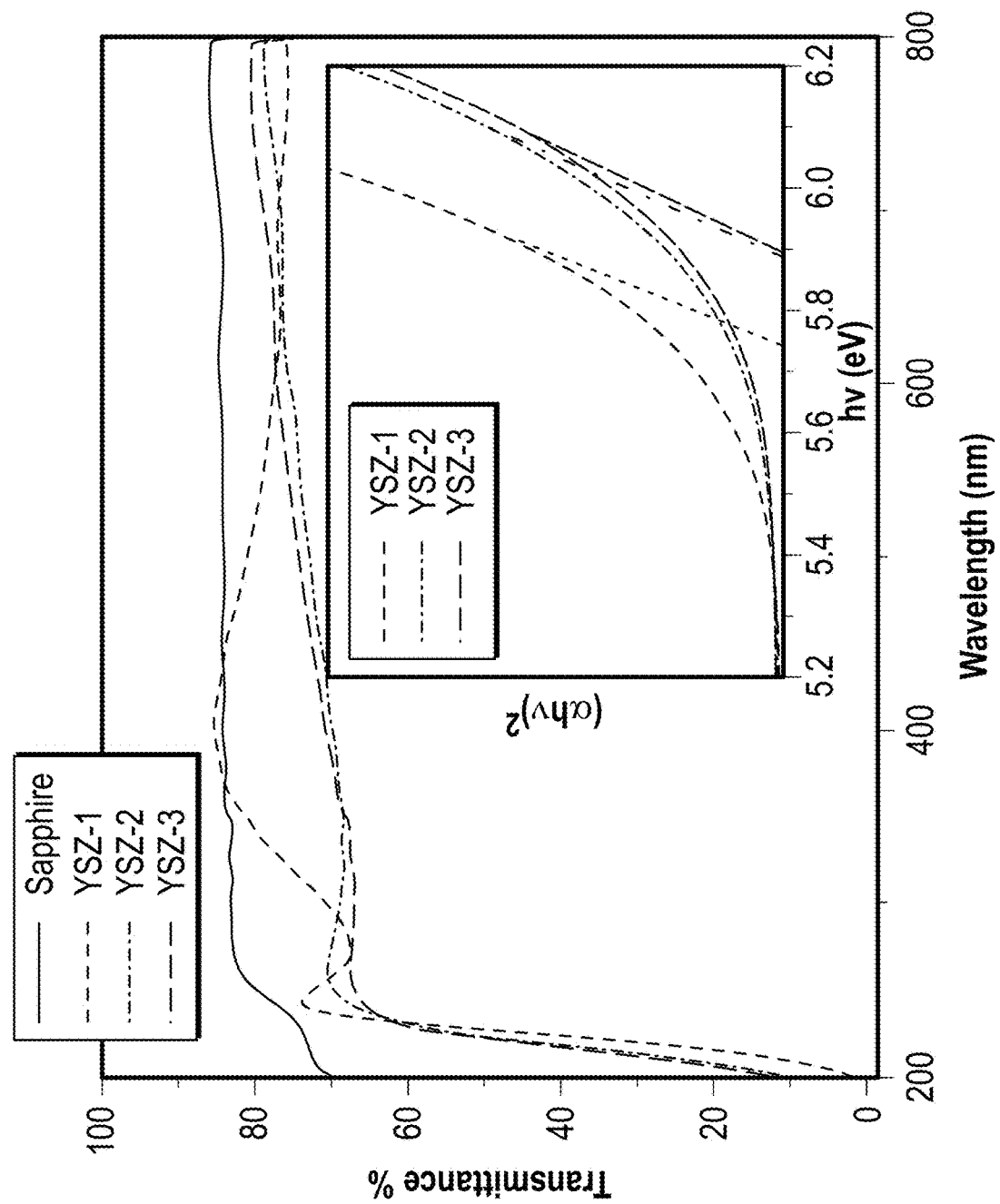
FIG. 9 illustrates the UV-Vis transmittance spectra of single layers of YSZ coatings that deposited on a sapphire single crystal substrate (R-plane, (1 $\bar{1}$ 0 2)) with different oxygen partial pressures used in the deposition process.

Referring to FIG. 9, the UV-Vis transmittance spectra of single layer of YSZ coatings deposited on a sapphire single crystal substrate (R-plane, (1 1̄ 0 2)) is shown with different oxygen partial pressures used in the deposition process. The insert is the plot of $(\alpha h\nu)^2$ vs. photon energy for YSZ films. ($\alpha$: absorption coefficient). The layers YSZ-1, YSZ-2, and YSZ-3 were deposited as discussed above in FIG. 7.

In an embodiment, 80 nm YSZ layers were deposited on polished sapphire substrates at different oxygen partial pressures to investigate the effect of the oxygen deficiency on the band structure of YSZ in particular on the material's band gap by performing spectral transmittance measurements. The transmittance spectra of YSZ layers together with an uncoated sapphire substrate are shown in FIG. 9. The YSZ coatings are transparent down to wavelength of ~250 nm, where a sharp drop in transmittance is observed which can be explained with an increase in absorption due to the interband transitions of electrons across the band gap. The optical band gap can be extracted from the photon energy dependence of $(\alpha h\nu)^2$ according to the relationship of $$\alpha \sim \frac{(h\nu - E_g)^q}{h\nu},$$

where $\alpha$ is absorption coefficient, $h\nu$ is the photon energy, $E_g$ is the material's band gap, and the exponent $q=\frac{1}{2}$ for a direct band gap material (Inset of FIG. 9). The band gap of YSZ-1 (zero oxygen partial pressure) is ~5.74 eV, which is in the range of reported YSZ films (5.4~5.9 eV). Increasing the oxygen partial pressure in the deposition process, the band gap energy increases by ~0.15 eV due to the suppression of localized defect states. The observation indicates that band gap decreases with oxygen deficiency.

In conclusion, a W—Ni-YSZ cermet-based spectrally-selective solar absorber was fabricated using polished stainless steel for high temperature solar thermal applications.

Changes in the optical properties of the solar absorbers upon annealing are due to changing surface morphology. which may be caused by metal diffusion into an oxygen deficient YSZ ARC layer. This diffusion and morphology change can be suppressed by depositing the YSZ ARC layer at high oxygen partial pressures to ensure full oxidation of YSZ and thermal stability at high temperatures. The optimized spectrally-selective solar absorber based on W—Ni-YSC cermet with a W IR-reflector as diffusion barrier deposited on a stainless steel substrate show great promise to be stable in vacuum up to 600° C. The demonstrated solar absorber exhibits a temperature-independent solar absorptance of about 0.91 and total hemispherical emittance of about 0.13 at about 500° C.

Figure 10:
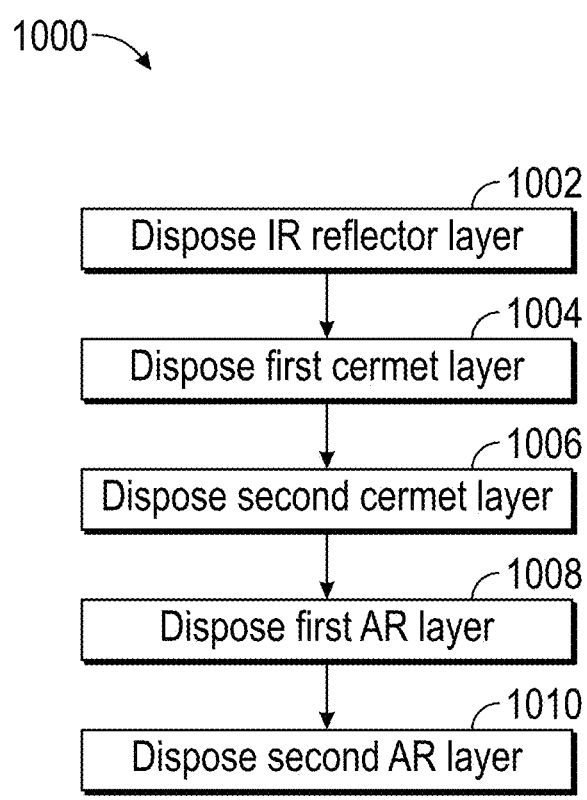
FIG. 10 is a flow chart of a method of manufacturing solar absorbers according to certain embodiments of the present disclosure.

FIG. 10 illustrates a method 1000 of fabricating a solar absorber, comprising: disposing by sputtering an IR reflector layer on a substrate at block 1002. At block 1004, a first cermet layer comprising W, Ni, and YSZ is disposed by sputtering in contact with the IR reflector layer disposed at block 1002. In an embodiment, the first cermet layer is disposed at block 1004 by sputtering using a DC power density of about 0.1 W/cm$^2$ to about 3 W/cm$^2$ for W, Mo, or Ag, about 0.1 W/cm$^2$ to about 10 W/cm$^2$ for Ni, Ag, Mo, Ta, or TaNi, and a RF power density of about 1 W/cm$^2$ to about 20 W/cm$^2$ for YSZ.

The method 1000 further comprises disposing, at block 1006, by sputtering, a second cermet layer in contact with the first cermet layer; disposing, by sputtering, at block 1008, a first anti-reflection coating layer in contact with the second cermet layer, and disposing, by sputtering, at block 1010, a second anti-reflection coating layer in contact with the first anti-reflection coating layer. In an embodiment, the second cermet layer comprises W, Ni, and YSZ and is disposed at block 1008 by sputtering at a DC power density of about 0.1 W/cm$^2$ to about 3 W/cm$^2$ for W, 0.1 W/cm$^2$ to about 10 W/cm$^2$ for Ni or Ni, and a RF power density of about 1 W/cm$^2$ to about 20 W/cm$^2$ for YSZ.

In an embodiment, the method 1000 further comprises fabricating the IR reflector layer at block 1002 by sputtering at a DC power density of about (1-5) W/cm$^2$, and the first anti-reflection layer disposed at block 1008 comprises Al$_2$O$_3$ or YSZ and is disposed at block 1002 by sputtering at a RF power density of 1 W/cm$^2$ to about 20 W/cm$^2$. In an embodiment, the first anti-reflection layer is disposed at block 1008, at an oxygen partial pressure from about zero to about 0.375 mTorr, and the second anti-reflection layer comprises SiO$_2$ and is disposed by sputtering using a RF power density of about 1 W/cm$^2$ to about 20 W/cm$^2$.

In an embodiment, the second anti-reflection layer is disposed at block 1010 at an oxygen partial pressure from about zero to about 0.375 mTorr, and wherein the second anti-reflection layer is disposed at an oxygen partial pressure less than the oxygen partial pressure used to dispose the first anti-reflection layer. In an embodiment, the second anti-reflection layer is disposed at block 1010 at an oxygen partial pressure from about 10% to about 50% less than the oxygen partial pressure used to dispose the first anti-reflection layer.

Exemplary embodiments are disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as "comprises," "includes," and "having" should be understood to provide support for narrower terms such as "consisting of," "consisting essentially of," and "comprised substantially of." Each and every claim is incorporated into the specification as further disclosure, and the claims are exemplary embodiment(s) of the present invention.

While exemplary embodiments of the invention have been shown and described, modifications thereof can be made by one skilled in the art without departing from the scope or teachings herein. The embodiments described herein are exemplary only and are not limiting. Many variations and modifications of the compositions, systems, apparatus, and processes described herein are possible and are within the scope of the invention. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order and with any suitable combination of materials and processing conditions.

What is claimed is:

1. A solar absorber, comprising:
   an IR reflector layer in contact with a substrate;
   a first cermet layer in contact with the IR reflector layer;
   a second cermet layer in contact with the first cermet layer, wherein the first cermet layer and the second cermet layer each comprise a metal volume fraction in a ceramic host material, wherein the metal volume fraction of the first cermet layer, the metal volume fraction of the second cermet layer, or both the metal volume fraction of the first cermet layer and the metal volume fraction of the second cermet layer comprises nickel (Ni);
   a sputtered first anti-reflection coating layer in contact with the second cermet layer; and
   a sputtered second anti-reflection coating layer in contact with the first anti-reflection coating layer,
   wherein the first sputtered anti-reflection coating layer is deposited at a higher partial oxygen pressure than the second anti-reflection coating layer, such that the first anti-reflection coating layer is a fully oxidized layer.

2. The solar absorber of claim 1, wherein the substrate comprises stainless steel, aluminum, copper, or combinations thereof.

3. The solar absorber of claim 1, wherein the IR reflector comprises tungsten (W), silver (Ag), molybdenum (Mo), or combinations thereof.

4. The solar absorber of claim 1, wherein the first anti-reflection layer comprises yttria-stabilized zirconia (YSZ) or Al$_2$O$_3$.

5. The solar absorber of claim 1, wherein the second anti-reflection layer comprises $SiO_2$.

6. The solar absorber of claim 1, wherein the ceramic host material of the first cermet layer and the ceramic host material of the second cermet layer each comprise yttria-stabilized zirconia (YSZ) and wherein the metal volume fraction of the first cermet layer, the metal volume fraction of the second cermet layer, or both the metal volume fraction of the first cermet layer and the metal volume fraction of the second cermet layer further comprise W, Ag, Mo, Ta, or a combination thereof.

7. The solar absorber of claim 6, wherein the metal volume fraction of the first cermet layer is higher than the metal volume fraction of the second cermet layer in the YSZ ceramic host material.

8. The solar absorber of claim 1, wherein the first cermet layer, the second cermet layer, and the first sputtered anti-reflection coating each comprise yttria-stabilized zirconia (YSZ).

9. The solar absorber of claim 1, wherein the IR reflector layer comprises tungsten (W), wherein the ceramic host material of the first cermet layer and the ceramic host material of the second cermet layer each comprise yttria-stabilized zirconia (YSZ) and wherein the metal volume fraction of the first cermet layer, the metal volume fraction of the second cermet layer, or both the metal volume fraction of the first cermet layer and the metal volume fraction of the second cermet layer further comprises W, Ag, Mo, Ta, or a combination thereof, and wherein the metal volume fraction of the first cermet layer is higher than the metal volume fraction of the second cermet layer in the YSZ ceramic host material, wherein the first sputtered anti-reflection coating layer comprises YSZ, wherein the second sputtered anti-reflection coating layer comprises silica ($SiO_2$), and wherein the solar absorber demonstrates a solar absorptance of about 0.91 and a total hemispherical emittance of about 0.13 at 500° C.

10. A method of fabricating a solar absorber, comprising:
depositing, by sputtering, an IR reflector layer on a substrate;
depositing, by sputtering, a first cermet layer in contact with the IR reflector layer;
depositing, by sputtering, a second cermet layer in contact with the first cermet layer;
depositing, by sputtering, a first anti-reflection coating layer in contact with the second cermet layer;
depositing, by sputtering, a second anti-reflection coating layer in contact with the first anti-reflection coating layer,
wherein the first cermet layer and the second cermet layer each comprise a metal volume fraction in a ceramic host material, wherein the metal volume fraction of the first cermet layer, the material volume fraction of the second cermet layer, or both the metal volume fraction of the first cermet layer and the metal volume fraction of the second cermet layer further comprises nickel (Ni), and
wherein the first anti-reflection coating layer is deposited at a higher partial oxygen pressure than the second anti-reflection coating layer, such that the first anti-reflection coating layer is a fully oxidized layer.

11. The method of claim 10, further comprising fabricating the IR reflector layer by sputtering at a DC power density of about (1-5) $W/cm^2$.

12. The method of claim 10, wherein the ceramic host material of the first cermet layer comprises YSZ and wherein the metal volume fraction of the first cermet layer further comprises W, Ag, Mo, Ta, or a combination thereof.

13. The method of claim 12, wherein the first cermet layer is deposited by sputtering using a DC power density of about 0.1 $W/cm^2$ to about 3 $W/cm^2$ for W, Mo, or Ag, 0.1 $W/cm^2$ to about 10 $W/cm^2$ for Ni, Ag, Mo, or TaNi, and a RF power density of about 1 $W/cm^2$ to about 20 $W/cm^2$ for YSZ.

14. The method of claim 12, wherein the second cermet layer is deposited by sputtering at a DC power density of about 0.1 $W/cm^2$ to about 3 $W/cm^2$ for W, Mo, or Ag, 0.1 $W/cm^2$ to about 10 $W/cm^2$ for Ni, Ag, Mo, or Ta, and a RF power density of about 1 $W/cm^2$ to about 20 $W/cm^2$ for YSZ.

15. The method of claim 10, wherein the ceramic host material of the second cermet layer comprises YSZ and the metal volume fraction of the second cermet layer further comprises W, Ag, Mo, Ta, or a combination thereof.

16. The method of claim 10, wherein the first anti-reflection layer comprises YSZ and $Al_2O_3$, and is deposited by sputtering at a RF power density of 1 $W/cm^2$ to about 20 $W/cm^2$.

17. The method of claim 16, wherein the first anti-reflection layer is deposited at an oxygen partial pressure from about zero to about 0.375 mTorr.

18. The method of claim 10, wherein the second anti-reflection layer comprises $SiO_2$ and is deposited by sputtering using a RF power density of about 1 $W/cm^2$ to about 20 $W/cm^2$.

19. The method of claim 18, wherein the second anti-reflection layer is deposited at an oxygen partial pressure from about zero to about 0.375 mTorr.

20. The method of claim 10 wherein the second anti-reflection layer is deposited at an oxygen partial pressure from about 10% to about 50% less than the oxygen partial pressure used to deposit the first anti-reflection layer.

* * * * *

UNITED STATES PATENT AND TRADEMARK OFFICE
CERTIFICATE OF CORRECTION

| | |
|---|---|
| PATENT NO. | : 10,533,777 B2 |
| APPLICATION NO. | : 15/580271 |
| DATED | : January 14, 2020 |
| INVENTOR(S) | : Zhifeng Ren et al. |

It is certified that error appears in the above-identified patent and that said Letters Patent is hereby corrected as shown below:

In the Specification

Column 1, Lines 21-31, delete the STATEMENT REGARDING FEDERALLY SPONSORED RESEARCH OR DEVELOPMENT and insert the following:
--STATEMENT REGARDING FEDERALLY SPONSORED RESEARCH OR DEVELOPMENT
This invention was made with government support under DE-AR0000471 and DE-SC0001299 awarded by the U.S. Department of Energy. The government has certain rights in the invention.--

Signed and Sealed this
Seventh Day of March, 2023

Katherine Kelly Vidal
*Director of the United States Patent and Trademark Office*